United States Patent [19]

Nishikawa

[11] Patent Number: 5,696,978
[45] Date of Patent: Dec. 9, 1997

[54] PERSONAL COMPUTER FOR PERFORMING POWER SAVE OPERATION OF AN EXTERNAL CRT BY DETERMINING A DPMS-COMPLIANT CRT

[75] Inventor: Hirofumi Nishikawa, Tokyo, Japan

[73] Assignee: Kabushiki Kaisha Toshiba, Kawasaka, Japan

[21] Appl. No.: 670,106

[22] Filed: Jun. 25, 1996

Related U.S. Application Data

[63] Continuation of Ser. No. 413,277, Mar. 30, 1995, abandoned.

[30] Foreign Application Priority Data

Sep. 30, 1994 [JP] Japan ................................. 6-236694

[51] Int. Cl.[6] ......................................................... G06F 1/32
[52] U.S. Cl. ................................................ 395/750; 345/212
[58] Field of Search ............................... 395/750; 345/212

[56] References Cited

U.S. PATENT DOCUMENTS

| | | | |
|---|---|---|---|
| 4,317,180 | 2/1982 | Lies | 395/750 |
| 4,317,181 | 2/1982 | Teza et al. | 395/750 |
| 4,409,665 | 10/1983 | Tubbs | 395/750 |
| 4,928,137 | 5/1990 | Kinoshita | 358/213.26 |
| 5,184,117 | 2/1993 | Gauthier | 340/784 |
| 5,230,074 | 7/1993 | Canova, Jr. et al. | 395/750 |
| 5,375,245 | 12/1994 | Solhjell et al. | 395/750 |
| 5,389,952 | 2/1995 | Kikinis | 345/212 |
| 5,404,543 | 4/1995 | Faucher et al. | 395/750 |
| 5,408,668 | 4/1995 | Tornai | 395/750 |
| 5,457,801 | 10/1995 | Aihara | 395/750 |

FOREIGN PATENT DOCUMENTS

| | | |
|---|---|---|
| 58-123118 | 7/1983 | Japan . |
| 5-100765 | 4/1993 | Japan . |
| 6-214681 | 8/1994 | Japan . |

OTHER PUBLICATIONS

IBM Technical Reference, "Personal System/2 Hardware Interface Technical Reference Common Interfaces", Oct. 1990, pp. 2–42 through 2–43.

Primary Examiner—Ayaz R. Sheikh
Attorney, Agent, or Firm—Finnegan, Henderson, Farabow, Garrett & Dunner, L.L.P.

[57] ABSTRACT

A CMOS memory stores DPMS-Enable/Disable data set by the user. When a display power save request has been issued from an operating system or an application program, the VBE/PM of a VGA BIOS determines, with reference to the DPMS-Enable/Disable data, whether or not a DPMS function is enabled. The VBE/PM executes the DPMS function including the interruption of the supply of horizontal and vertical synchronization signals, if the DPMS function is enabled, and does not execute the DPMS function if it is disabled. Thus, the execution of the DPMS control function can be allowed or prohibited in accordance with the contents of the DPMS-Enable/Disable data.

20 Claims, 10 Drawing Sheets

BATTERY OPTION

| SET ITEM | SET CONTENTS |
|---|---|
| HDD AUTO OFF | DISABLED<br>03 MIN<br>05 MIN<br>10 MIN<br>15 MIN<br>20 MIN<br>30 MIN |
| DISPLAY AUTO OFF | DISABLED<br>01 MIN<br>03 MIN<br>05 MIN<br>10 MIN<br>15 MIN<br>20 MIN<br>30 MIN<br>ALWAYS OFF |
| SYSTEM AUTO OFF | DISABLED<br>10 MIN<br>20 MIN<br>30 MIN<br>40 MIN<br>50 MIN<br>60 MIN |
| SLEEP MODE | ENABLED<br>DISABLED |
| LCD BRIGHTNESS | BRIGHT<br>SEMI-BRIGHT |
| BATTERY SAVE MODE | FULL POWER<br>LOW POWER<br>USER POWER |
| DPMS | ENABLED<br>DISABLED |

FIG. 2

| STATE | SIGNALS | | | LEVEL DEFINED BY DPMS | POWER SAVINGS | RECOVERY TIME |
|---|---|---|---|---|---|---|
| | HORIZONTAL | VERTICAL | VIDEO | | | |
| ON | PULSES | PULSES | ACTIVE | ESSENTIAL | NONE | --- |
| STAND-BY | NO PULSES | PULSES | BLANKED | OPTION | MINIMUM | SHORT |
| SUSPEND | PULSES | NO PULSES | BLANKED | ESSENTIAL | EFFECTIVE | LONGER |
| OFF | NO PULSES | NO PULSES | BLANKED | ESSENTIAL | MAXIMUM | DEPEND ON SYSTEM |

FIG. 3

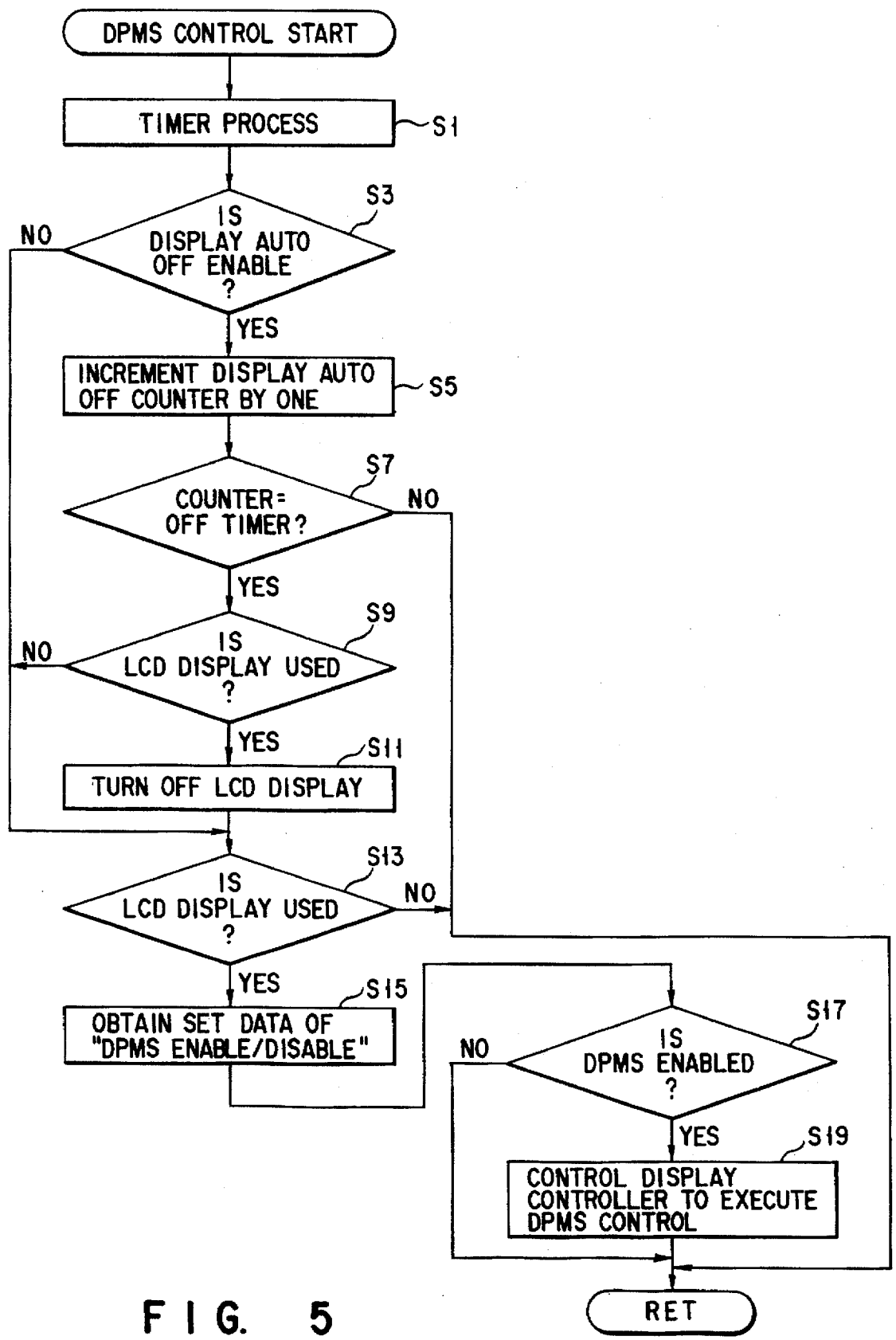
F I G. 5

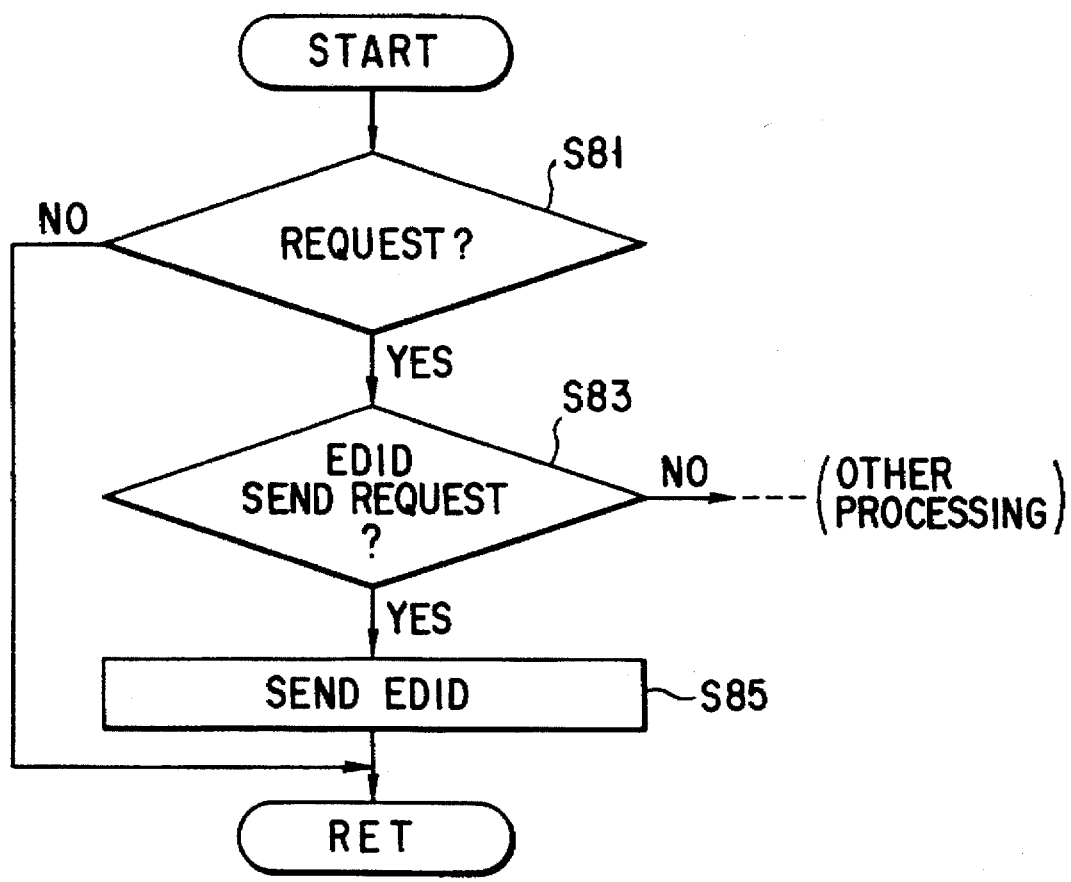
F I G. 10

PERSONAL COMPUTER FOR PERFORMING POWER SAVE OPERATION OF AN EXTERNAL CRT BY DETERMINING A DPMS-COMPLIANT CRT

This is a continuation of application Ser. No. 08/413,277, filed Mar. 30, 1995, now abandoned.

BACKGROUND OF THE INVENTION

1. Field of the Invention

This invention relates to a portable personal computer of a lap-top type or a note-book type, and more particularly to a computer system with a function for performing power save control of a CRT display and a method for executing the function.

2. Description of the Related Art

Recently, many portable personal computers of a lap-top type or a note-book type, which can be driven by batteries, have been developed. These computers have a power-save function such as an HDD auto-off function, a CPU sleep function, etc., for saving the consumption power.

Further, DPMS (Display Power Management Signaling) or standard for display power saving has already been defined in the VESA (Video Electronics Standards Association), and CRT displays designed to be compliant with the DPMS are now being developed.

The DPMS is a standard for controlling a horizontal synchronization signal and a vertical synchronization signal output from a display controller in a system to an external CRT display, thereby saving the power consumption of the external CRT. The DPMS function is executed by a DPMS compliant software interface called "VBE/PM" (VESA BIOS Extensions/Power Management).

When the VBE/PM has been executed by a host program such as an OS or an application program, it unconditionally controls the display controller, thereby performing DPMS control for interrupting the supply of the synchronization signals. The mode of the DPMS compliant CRT display is shifted to a power-saving mode in response to the interruption of the synchronization signals, thereby saving the power of the CRT display.

Most of CRT displays now being used, however, are not compliant with the DPMS. Therefore, if the user executes the VBE/PM in a system to which a DPMS non-compliant CRT display is connected, the CRT display may be adversely affected and be destructed at worst.

Since in the conventional case, the VBE/PM is unconditionally executed in response to a command from a host program such as an OS or an application program, the interruption of the supply of synchronization signals may adversely affect and at worst destruct the DPMS non-compliant CRT display being used.

SUMMARY OF THE INVENTION

The present invention has been developed in light of the above-described circumstances, and its object is to provide a power-consumption saving method for realizing a highly reliable power save function, which disables DPMS control where a DPMS non-compliant CRT display is used as a display monitor, and a computer system to which the method is applicable.

A computer system capable of using a CRT display as a display monitor, according to the invention comprises a display controller for controlling the CRT display; a memory unit storing power save control data for enabling and disabling a CRT power save function, respectively, the CRT power save function interrupting the supply of at least one of a horizontal synchronization signal and a vertical synchronization signal from the display controller to the CRT display; and power save control means including means responsive to a display power save request from an operating system, an application program, or a power management program which are executed in the computer system, for determining, with reference to the power save control data in the memory unit, whether or not the power save function is enabled, and means for interrupting the supply of at least one of the horizontal and vertical synchronization signals from the display controller to save request. The computer system is characterized in that the execution of the power save function including the interruption of the supply of at least one of the horizontal and vertical synchronization signals can be allowed or prohibited in accordance with the contents of the power save control data.

In the computer system constructed as above, the user sets power save control data after turning on the system, using a utility program, a set-up program, etc. The power save control is enabled in the case of using a DPMS compliant CRT, and disabled in the case of using a DPMS non-compliant CRT. The power save control data is stored in a memory unit such as a CMOS memory.

When a display power save request has been issued, the power save control data set by the user is referred to, thereby determining whether or not the power save function is enabled. In accordance with the determination result, the supply of the synchronization signals to the CRT display is controlled. Specifically, if the power save control data indicates that the power save function is enabled, the power save control including the interruption of the supply of the synchronization signals is executed. On the other hand, if the power save control data indicates that the power save function is disabled, the power save control is not executed.

Accordingly, the execution of the power save function can be allowed or prohibited in accordance with the contents of the power save control data. Thus, in the case of using a DPMS non-compliant CRT display as a display monitor, the execution of the DPMS control can be invalidated.

The computer system according to the invention further comprises key-input waiting-period monitoring means for monitoring the key-input waiting period of each of the operating system and the application program executed in the computer system; means for turning off the back light of the flat panel display to turn off the display of the same when the key-input waiting-period monitoring means has detected that a key-input waiting state has been kept for a predetermined period of time; and means for issuing the display power save request and activating the power save control means when the key-input waiting-period monitoring means has detected that the key-input waiting state has been kept for the predetermined period of time.

In the above structure, the display power save request is issued also when the key-input waiting state has been kept for a predetermined period of time. Therefore, an interface for automatically turning off the flat panel display can be used to perform the DPMS control. For example, the flat panel display and the CRT display which are displaying data at the same time can be turned off simultaneously. Since also in this case, the DPMS control is not performed if the CRT display is a DPMS non-compliant one, no bad influence is exerted on the CRT.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 2 is a table, showing various data items concerning battery save, stored in a CMOS memory installed in the computer system of FIG. 1;

FIG. 3 is a table, showing the relationship between power save modes and synchronization signals in a DPMS compliant CRT display employed in the computer system of FIG. 1;

FIG. 5 is a flowchart, useful in explaining the operation of VBE/PM incorporated in the VGA BIOS of the computer system of FIG. 1;

FIG. 10 is a flowchart, useful in explaining the operation of a DPMS compliant CRT employed in the system of FIG. 9.

DETAILED DESCRIPTION OF THE PREFERRED EMBODIMENTS

The embodiments of the invention will be explained with reference to the accompanying drawings.

Figure 1:
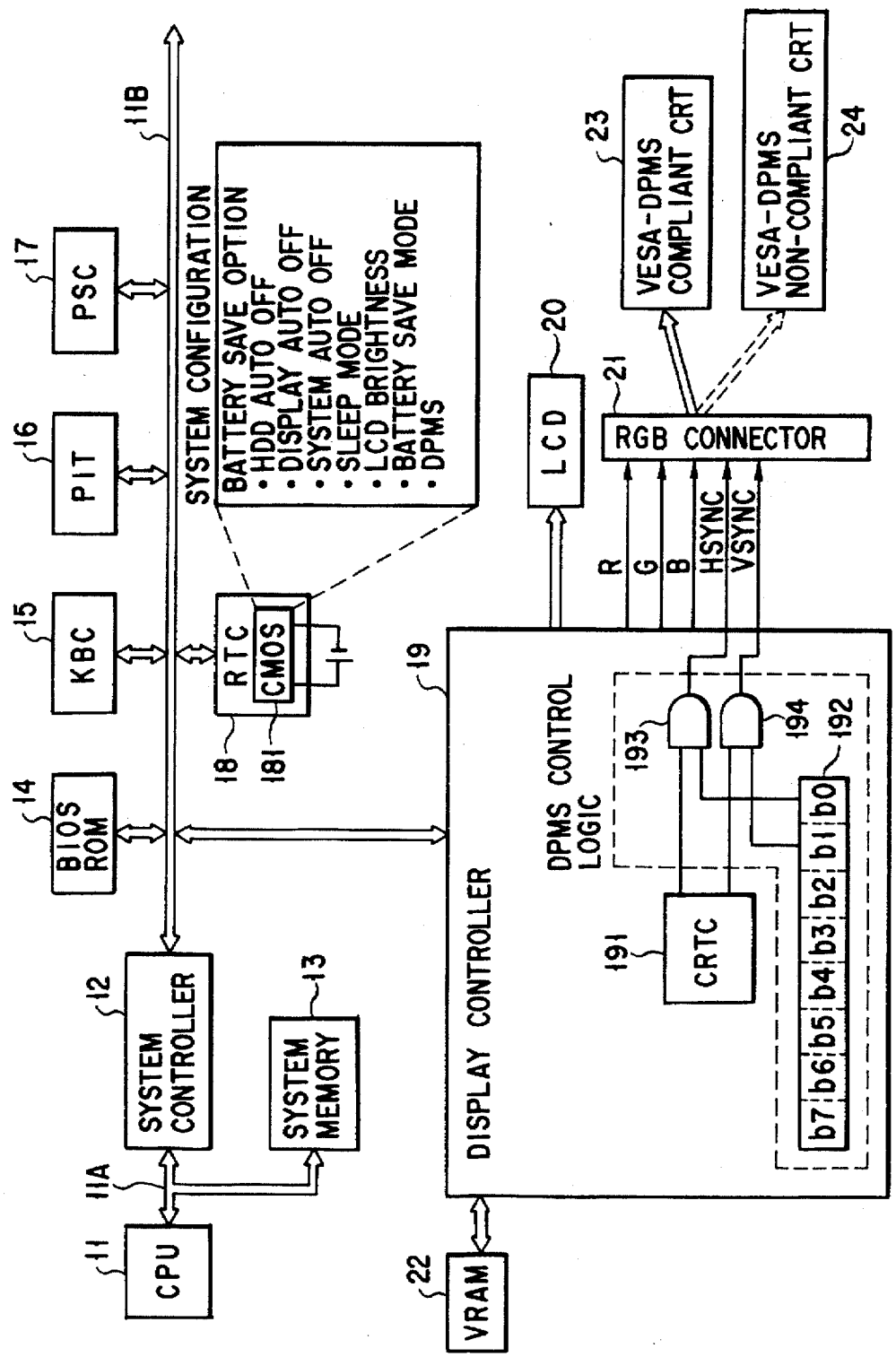
FIG. 1 is a block diagram, showing a computer system according to an embodiment of the invention.

FIG. 1 shows a computer system according to an embodiment of the invention. This computer system is a battery-driven personal computer system of a lap-top type or a note-book type, and comprises a CPU 11, a system controller 12, a system memory 13, a BIOS ROM 14, a keyboard controller (KBC) 15, a system timer (PIT) 16, a power supply controller (PSC) 17, a real-time clock (RTC) 18, a display controller 19, an LCD 20, a RGB connector 21, and a video memory (VRAM) 22.

The CPU 11 and the memory 13 are connected to a CPU local bus 11A which includes a data bus of a 32-bit width. The CPU local bus 11A is connected, via a bus-switching circuit employed in the system controller 12, to a system bus 11B which is designed according to ISA specifications and includes a data bus of a 16-bit width. The system bus 11B is connected to the BIOS ROM 14, the keyboard controller (KBC) 15, the system timer 16, the power supply controller (PSC) 17, the real time clock (RTC) 18 and the display controller 19.

The system controller 12 is a gate array for controlling the memory or I/O in the system. The system memory 13 stores an operating system, an application program (including a utility program), user data created by the application program, etc.

The BIOS ROM 14 is used for storing a system BIOS (Basic I/O System), and consists of a programmable flash memory. The system BIOS consists of organized function-executing routines for accessing various hardware elements in the system.

The system BIOS includes an IRT routine to be executed when the system has been turned on, and BIOS drivers (INT10h-1Fh, 40h-4Fh) for controlling the hardware elements. Each BIOS driver includes a plurality of function-executing routines, corresponding to the operating system and the application system, for imparting to the systems a plurality of functions for controlling the hardware elements.

Further, a VGA BIOS driver (INT10h) incorporates a software interface corresponding to a DPMS called "VBE/PM (VESA BIOS Extensions/Power Management)". The VBE/PM incorporated in the VGA BIOS driver executes the DPMS control in accordance with "DPMS-Enable/Disable" data set in a CMOS memory 181.

The BIOS ROM 14 further stores a system auto-off program including a display auto-off routine, a set-up program and a pop-up program.

The set-up program is executed when a predetermined command has been input by key input operation, and sets or changes system configuration data in accordance with the user's key operation. The system configuration data set or changed by the set-up program is stored in the CMOS memory 181 backed up by its original battery.

As is shown in FIG. 1, the system configuration data stored in the CMOS memory 181 includes set data regarding various functions for battery saving (HDD auto-off, display auto-off, system auto-off, sleep mode, LCD brightness, battery save mode, DPMS). FIG. 2 shows examples of set contents of the set data.

The HDD auto-off function interrupts the power supply from the power supply controller 17 to the HDD when there has been no key input for more than a set time period (3 minutes, 5 minutes, . . . ), thereby stopping the operation of the motor which rotates the HDD. Where "Disable mode" is selected, the HDD auto-off function is not executed. The display auto-off function interrupts the power supply from the power supply controller 17 to the back light of the LCD 20 when there has been no key input for more than a set time period (3 minutes, 5 minutes, . . . ), thereby turning off the LCD 20. Where "Disable mode" is selected, the display auto-off function is not executed. The display auto-off function is realized by a timer interruption routine (INT 8h) executed in response to a timer interruption signal output from the system timer 16 to the CPU 11, and a display auto-off routine executed by the timer interruption routine.

The system auto-off function interrupts the power supply from the power supply controller 17 to all units other than the system memory 13 when there has been no key input for more than a set time period (3 minutes, 5 minutes, . . . ), thereby suspending the system. Where "Disable mode" is selected, the system auto-off function is not executed.

The DPMS function controls a horizontal synchronization signal and a vertical synchronization signal output from the display controller 19 to the external CRT display, in response to a command from a high-order program such as an OS or an application program, thereby saving the power of the external CRT display. The DPMS function is executed only where "Enable mode" is selected, and is not executed where "Disable mode" is selected.

The display controller 19 shown in FIG. 1 controls the LCD 20 installed as a standard equipment in the present personal computer, and the external CRT display connected to the RGB connector 21. The controller 19 has a function for simultaneously displaying the data in the VRAM 22 on both the LCD 20 and the external CRT display. Further, the display controller 19 has a hardware logic for the DPMS control.

As is shown in FIG.1, the hardware logic consists of a DPMS control register 192 and AND gates 193 and 194, and controls a horizontal synchronization signal (HSYNC) and a vertical synchronization signal (VSYNC) output from a CRT controller 191 to the external CRT display via the RGB connector 21.

The DPMS control register 192 is an I/O register whose data can be read or written by the VBE/PM. If data b0 in the register 192 is "1", the HSYNC is supplied to the external CRT display, whereas if b0="0", the supply of the HSYNC is stopped. Further, if data b1 in the register 192 is "1", the VSYNC is supplied to the external CRT display, whereas if bb1="0", the supply of the VSYNC is stopped.

The external CRT display connectable to the RGB connector 21 can be divided broadly into two types—a CRT display 23 which is compliant with the DPMS (i.e., DPMS compliant CRT display), and a CRT display 24 which is not compliant with the DPMS (i.e., DPMS non-compliant CRT display). The DPMS compliant CRT display 23 has a function for monitoring whether the HSYNC and the VSYNC are being supplied, and setting a predetermined power save mode when it is determined that their supply has been stopped. FIG. 3 shows the relationship between the supply states of the HSYNC and the VSYNC and the power save mode.

As is shown in FIG. 3, the DPMS compliant CRT display 23 is set to "On mode", "Stand-by mode", "Suspend mode" or "Off mode" in accordance with the supply states of the HSYNC and the VSYNC. The "On mode" is a usual operation mode for displaying data on the CRT display 23. In third mode, the HSYNC and the VSYNC are supplied to the CRT display 23. The "Stand-by mode" is a power save mode which has a minimum power save effect. In this mode, the supply of the HSYNC is stopped. The "Suspend mode" is a power save mode which has a higher power save effect than in the "Stand-by mode", and the supply of the VSYNC is stopped in the Suspend mode. The "Off mode" is a power save mode which has a maximum power save effect, and the supply of both the HSYNC and the VSYNC is stopped in this mode.

Figure 4:
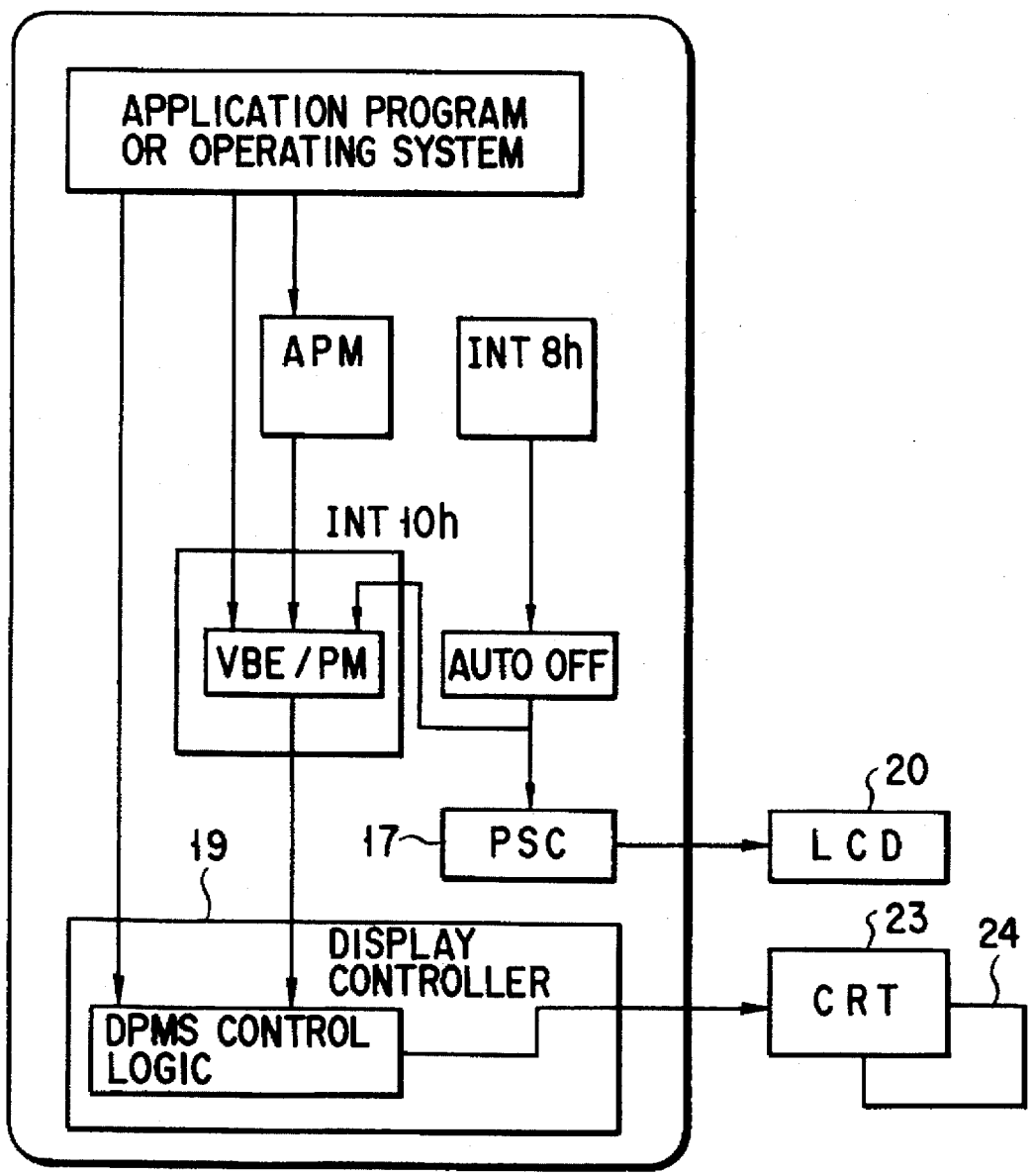
FIG. 4 is a schematic view, showing a display power save architecture employed in the computer system of FIG. 1.

FIG. 4 shows the concept of the display power save architecture employed in the FIG. 1 system.

The VBE/PM incorporated in the VGA BIOS (INT 10h) is executed in response to a display power save request from the application program, the operating system or an APM (Advanced Power Management) driver. The APM driver is a program dedicated to power management and consisting of an APM driver interface incorporated in each of the operating system and the system BIOS. Further, the VBE/PM also responds to a display power save request issued in a display auto-off routine activated by the timer interruption routine (INT 8h) of the system BIOS.

FIG. 5 is a flowchart showing the operations of the Auto Display Off and the VBE/PM. In step S1 of FIG. 5A, the timer process is performed. Namely, the timer counts a predetermined period of time (e.g., 64 msec) and issues a timter interrupt to thereby execute the timter interrupt routine (INT 8h).

In step S3, the VBE/PM determines, in response to the timer interrupt, whether or no the Display Auto Off is enabled. If the determination of step S3 is affirmative, the VBE/PM increments a Display Auto Off counter by one in step S5. Then, in step S7, the VBE/PM determines whether or not the counter value reaches the OFF time. If the determination of the step S7 is affirmative, the VBE/PM determines in step S9 whether or not the LCD display is used. If the determination of step S9 is affirmative, the VBE/PM turns off the back light of LCD display in step S11. Then, in step S13, the VBE/PM determines whether or not the CRT display is used. If the determination of step S13 is affirmative, the VBE/PM reads the "DPMS-Enable/Disable" data from the CMOS memory 181, thereby determining whether or not the "DPMS-Enable mode" is set (steps S15 and S17). If it is determined that the "DPMS-Enable mode" is set, the VBE/PM controls the DPMS control logic of the display controller 19, thereby performing the DPMS control (step S19). On the other hand, if the "DPMS-Disable mode" is set, the VBE/PM terminates the processing without controlling the DPMS control logic of the display controller 19.

The timer interruption routine (INT 8h) is executed whenever a timer interruption signal is issued from the system timer 16 to the CPU 11. In this routine, it is determined whether or not the program waits key input on the basis of whether or not a key signal received by a keyboard control driver (INT 16h) is stored in a key buffer. If the program is waiting key input, it counts up by +1 the value of a counter for monitoring the key input-waiting period. If the program does not wait key input, it clears the value of the counter. When the key input-waiting period indicated by the counter value has become equal to a display auto-off time period set by the CMOS memory 181, the timer interruption routine activates the display auto-off routine. The display auto-off routine issues a command to the power supply controller 17, thereby turning off the back light of the LCD 20. Moreover, the display auto-off routine includes an interface for executing the VBE/PM. After causing the power supply controller 17 to turn off the back light of the LCD 20, the display auto-off routine issues a display power save request, thereby executing the VBE/PM. Also at this time, the VBE/PM is executed in the manner indicated by the flowchart of FIG. 5.

Each function of the VBE/PM of the VGA BIOS (INT 10h) will now be explained. The VBE/PM provides the OS or the application program with a function for obtaining VBE/PM data, a function for setting a display power status and a function for obtaining the display power status.

Figure 6:
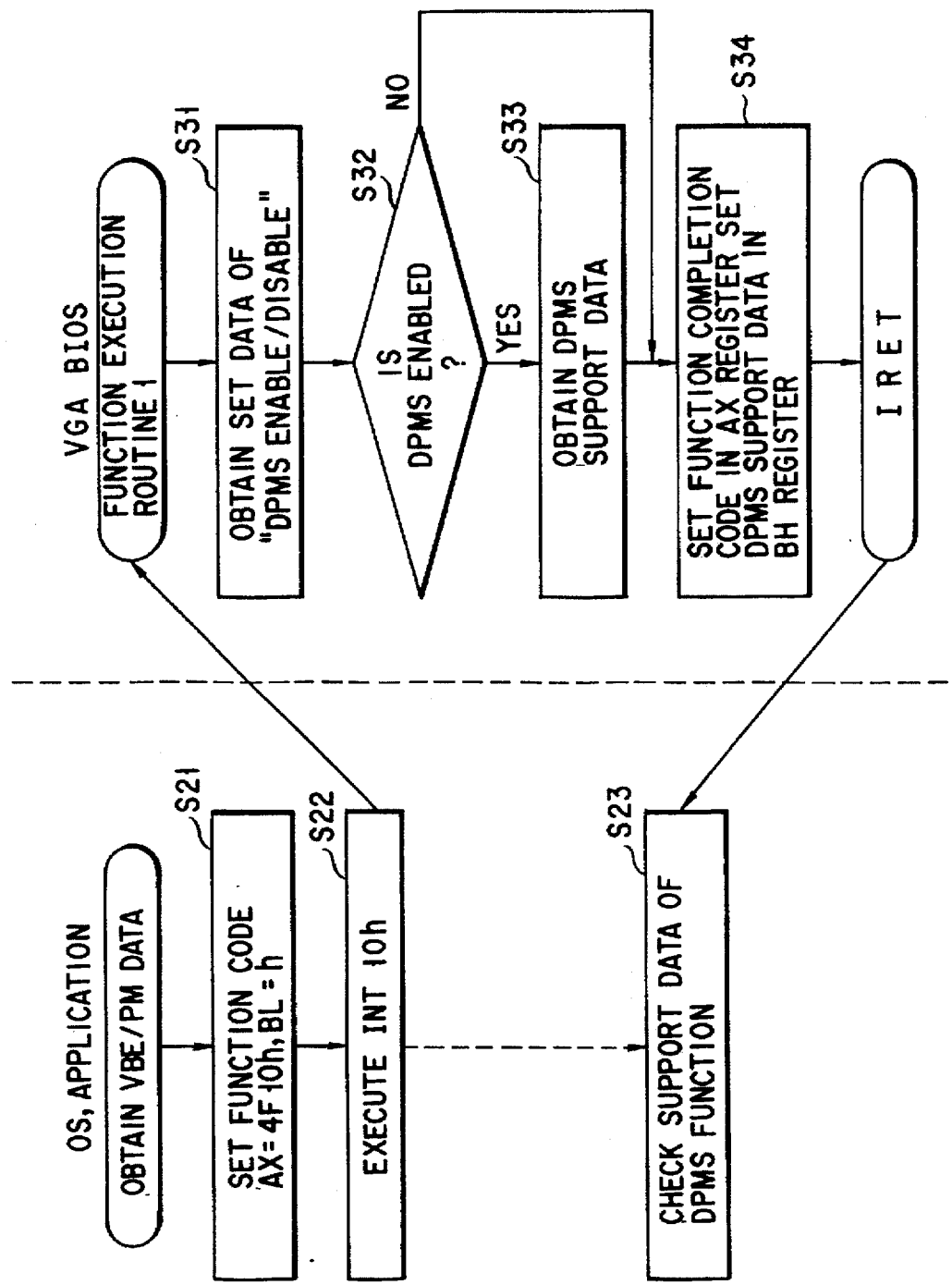
FIG. 6 is a flowchart, useful in explaining a first function-executing routine included in the VBE/PM of FIG. 5.

Referring first to FIG. 6, the function for obtaining the VBE/PM data will be explained.

This function notifies the OS or the application program of the contents of the DPMS function supported by the VBE/PM and the DPMS control logic.

The OS or the application program first sets a function code and a sub function code for enabling the AX register and the BL register of the CPU 11 to call the VBE/PM data-obtaining function, and then executes the command of the INT 10h (steps S21 and S22). Then, the processing proceeds to the execution of the function-executing routine 1 of the VBE/PM of the VGA BIOS.

In the function-executing routine 1, first the "DPMS-Enable/Disable" data stored in the CMOS memory 181 is accessed, thereby determining whether or not the "DPMS-Enable mode" is set (steps S31 and S32). If it is determined that the "DPMS-Enable mode" is set, DPMS support data indicative of the DPMS function supported by the VBE/PM is read from the BIOS ROM 14 (step S33).

Thereafter, in the function-executing routine 1, a function completion code and the read DPMS support data are set in the AX register and the BL register, respectively, thereby executing an IRET command. Then, the processing returns to the execution of the OS and the application program (step S34).

On the other hand, if the "DPMS-Disable mode" is set, a function completion code and data indicating that the DPMS function is not supported are set in the AX register and the BL register, respectively, thereby executing the IRET command. Then, the processing returns to the execution of the OS and the application program (step S34).

In the OS or the application program, the BL register value is received as an output value from the VGA BIOS, and the DPMS function supported by the system is checked (step S23).

The relationship between input values and output values in the FIG. 6 processing is as follows:

---

[Inputs]

AX = 4F10h
BL = 00h
[Outputs]

AX = Function Completion Status
BH = DPMS Control Signal Support Data
0 : Not supported
b0 = 1 : STAND-BY Mode Support
b1 = 1 : SUSPEND Mode Support
b2 = 1 : OFF Mode Support
b3-b7 : Reservation

---

Figure 7:
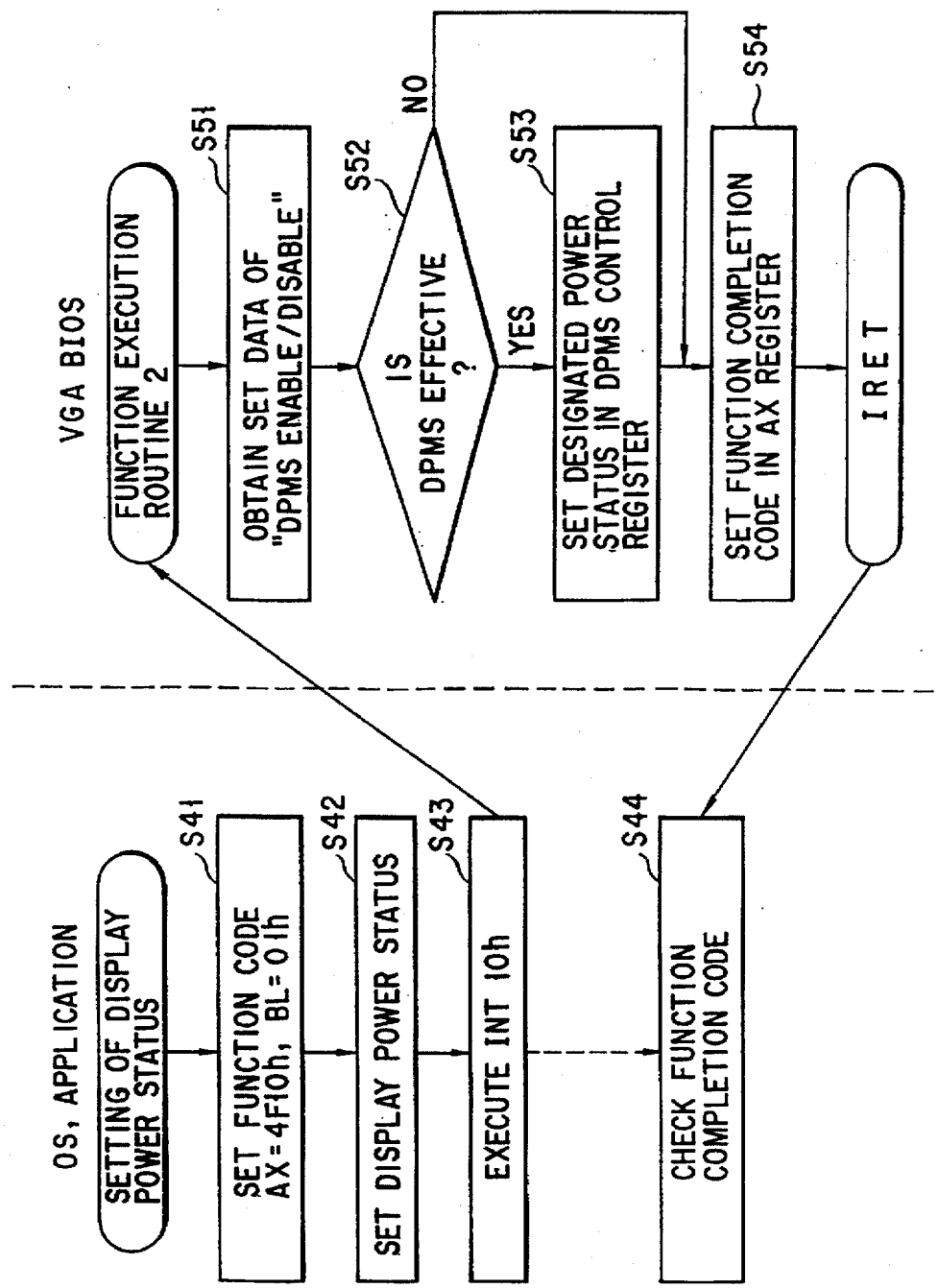
FIG. 7 is a flowchart, useful in explaining a second function-executing routine included in the VBE/PM of FIG. 5.

Referring to FIG. 7, the function for setting the display power status will be explained.

This function is used to switch the operation mode of the CRT display by the DPMS control.

The OS of the application program first sets a function code and a sub function code for calling the display power status-setting function in the AX register and BL register of the CPU 11, then sets in the BH register display power status data for designating the CRT operation mode, and executes the command of the INT 10h (Steps S41, S42 and S43). Then, the processing proceeds to the execution of the function-executing routine 2 of the VBE/PM of the VGA BIOS.

In the function-executing routine 2, first the "DPMS-Enable/Disable" data stored in the CMOS memory 181 is accessed, thereby determining whether or not the DPMS-Enable mode is set (steps S51 and S52). If the DPMS-Enable mode is set, predetermined values are set for bits b0 and b1 in the DPMS control register 192 in accordance with the designated power status data (step S53). The relationship between the display mode designated by the power status data and the bits b0 and b1 of the DPMS control register 192 is as follows:

| Status | b0 | b1 |
|---|---|---|
| On | 1 | 1 |
| Stand-by | 1 | 0 |
| Suspend | 0 | 1 |
| Off | 0 | 0 |

Thereafter, in the function-executing routine 2, the function completion code is set in the AX register, and the IRET command is executed, followed by the processing returning to the execution of the OS or the application program (step S54).

On the other hand, if the DPMS-Disable mode is set, a function completion code indicative of an error is set in the AX register, and then the IRET command is executed, followed by the processing returning to the execution of the OS or the application program (step S54).

In the OS or the application program, the function completion code is checked (step S23).

The relationship between input values and an output value in the FIG. 7 processing is as follows:

---

[Inputs]

AX = 4F10h
BL = 01h
BH = Display Power Status Set Value
    00h    ON
    01h    STAND BY
    02h    SUSPEND
    04h    OFF
    Others:  RESERVATION
[Output]

AX = Status

---

Figure 8:
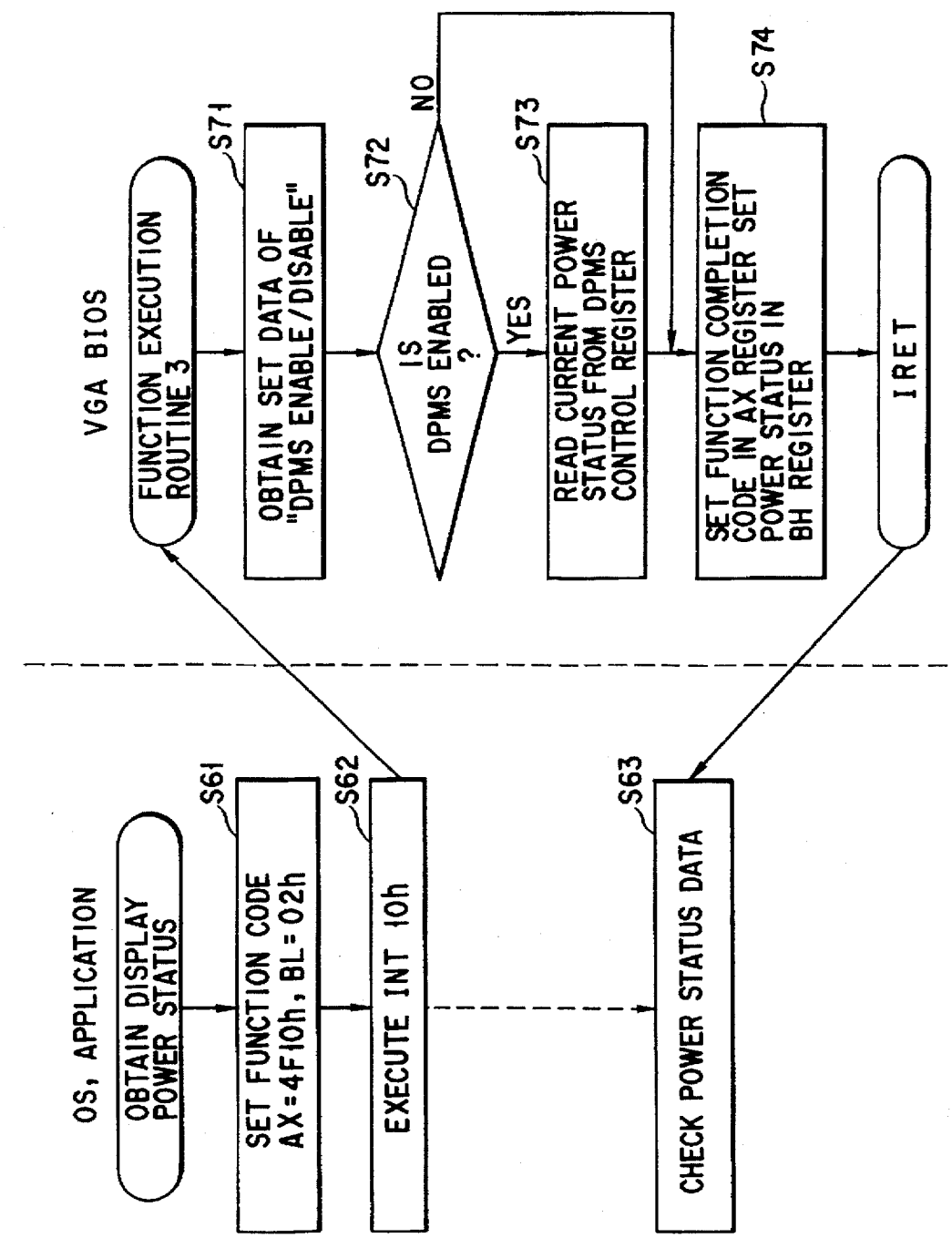
FIG. 8 is a flowchart, useful in explaining a third function-executing routine included in the VBE/PM of FIG. 5.

Referring then to FIG. 8, the function for obtaining the display power status will be explained.

This function is used to notify the OS or the application program of the present CRT operation mode.

In the OS or the application program, the function code and the sub function code are set for calling the display power status-obtaining function in the AX register and BL register of the CPU 11, then executing the command of the INT 10h (steps S61 and S62). Then, the processing proceeds to the execution of the function-executing routine 3 of the of the VBE/PM of the VGA BIOS.

In the function-executing routine 3, first the "DPMS-Enable/Disable" data stored in the CMOS memory 181 is accessed, thereby determining whether or not the DPMS-Enable mode is set (steps S71 and S72). If the DPMS-Enable mode is set, the present CRT operation mode is determined from the values of the bits b0 and b1 in the DPMS control register 192 (step S73). Thereafter, a function completion code and power status data corresponding to the read operation mode are set in the AX register and the BH register, respectively, and the IRET command is executed, followed by the processing returning to the execution of the OS or the application program (Step S74).

On the other hand, if the DPMS-Disable mode is set, a function completion code indicative of an error is set in the AX register, and then the IRET command is executed, followed by the processing returning to the execution of the OS or the application program (step S74).

In the OS or the application program, a value registered in the BH register is received as the output value of the VGA BIOS, thereby checking the present CRT operation mode (step S63).

The relationship between input values and output values in the FIG. 8 processing is as follows:

---

[Inputs]

AX = 4F10h
BL = 02h
[Outputs]

AX = Status

| BH = | Display Power Status Set Value |
|---|---|
| 00h | ON |
| 01h | STAND BY |
| 02h | SUSPEND |
| 04h | OFF |
| Others: | RESERVATION |

As described above, in this embodiment, the execution of the DPMS control function, in particular of the power status-setting function, can be allowed or prohibited in accordance with the user's setting of the DPMS-Enable/ Disable data. Accordingly, where a DPMS non-compliant CRT display is used as a display monitor, the execution of the DPMS control can be prevented.

Further, since the display auto-off function for the LCD 20 is used as an interface for activating the VBE/PM, both of the LCD 20 and the CRT display 23 can be turned off at the same time if there is no key input for a predetermined period of time while data are simultaneously displayed on both the LCD 20 and the CRT display 23.

Although in this embodiment, the DPMS control logic is provided in the display controller 19, the invention can be modified such that the DPMS control register 192 is provided in the system controller 12, and AND gate circuits 193 and 194 which are controlled by values set in the DPMS control register 192 are provided in the next stage of the display controller 19. This modification can realize DPMS control without improving the display controller 19.

Moreover, although in the embodiment, the DPMS control is applied only to the CRT display, it is also applicable to a display other than the CRT, such as an LCD, if the display matches with the VESA DPMS.

Figure 9:
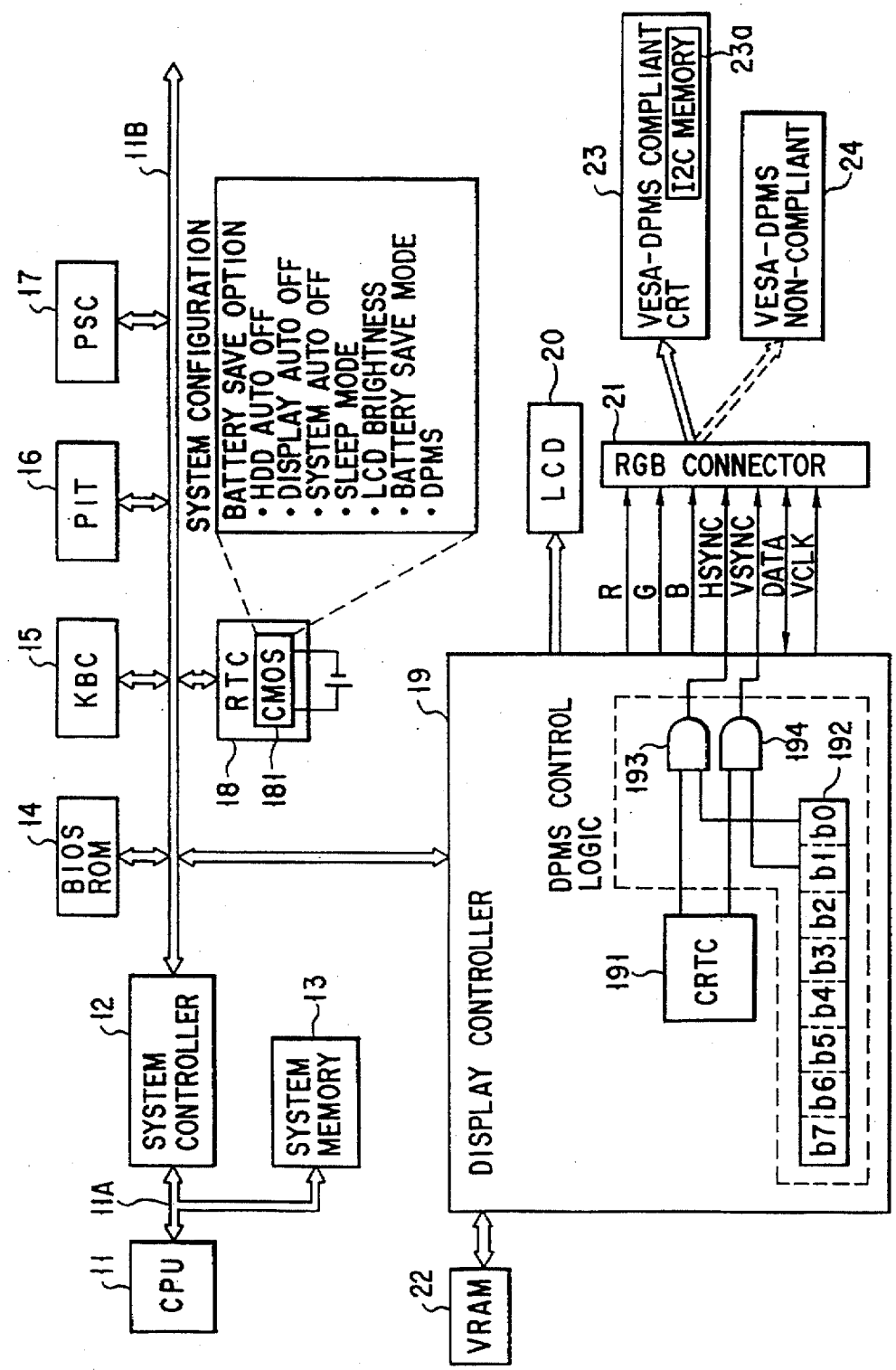
FIG. 9 is a block diagram, showing a computer system according to another embodiment of the invention.

FIG. 9 is a block diagram, showing a computer system according to another embodiment of the invention. This embodiment employs a display data channel (DDC) having a function for notifying a host system of the attribute data of a display from the side of the display.

This embodiment further employs a DATA signal and a VCLK signal as interface signals transmitted between the display controller 19 and the RGB connector 21. These interface signals are based on Phillips I2C bus specification.

The VESA-DPMS compliant CRT 23 has a I2C memory consisting of a ROM. The I2C memory stores EDID (Extended Display Identification Data) which includes data indicating that the CRT is compliant with the DPMS. The EDID is read by the display controller 19 in synchronism with a clock signal (CLK), and notified to the OS. The EDID can be read in response to the vertical synchronization signal (VSYNC), in place of the clock signal (CLK).

FIG. 10 is a flowchart, useful in explaining the operation of the VESA DPMS compliant CRT assumed when the EDID is transmitted.

In step S81, the CRT 23 detects whether or not a request signal from the display controller 19 is present. If the determination of step S81 is affirmative, the CRT 23 checks in step S83 whether or not the request signal indicates the EDID send request. If the determination of step S83 is affirmative, the CRT 23 sends SDID to the display controller 19 in step S85.

The display controller 19 notifies the OS of the received EDID. The OS refers to the DPMS-Enable/Disable data set by the user in the CMOS memory 181, and notifies the VBE/PM incorporated in the VGA BIOS of the DPMS-Disable data if the DPMS-Disable data is set in the memory 181, even when the EDID from the CRT 23 indicates that the CRT is a DPMS compliant one. As a result, the VBE/PM terminates the processing without controlling the DPMS control logic of the display controller 19.

Although in the above-described embodiment, the OS is arranged not to notify the VBE/PM of the EDID, the invention may be constructed such that the OS notifies the VBE/PM of the EDID, and the VBE/PM refers to the flowchart of FIG. 5, thereby prohibiting the operation of the DPMS control logic on the basis of the DPMS-Disable data stored in the memory 181.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A computer system provided with a CRT display and a flat panel display as a display monitor, comprising:

a display controller for controlling the CRT display;

means for causing a user to select enable or disable of each of an auto display off function and a DPMS (Digital Power Management Signaling) function, the auto display off function turning off the display of the flat panel display unit and the DPMS function saving power of the CRT display unit if no key input is present for a predetermined period of time;

a memory unit storing a the selected enable or disable data of each of the auto display off function and the DPMS function; and power save control means including means responsive to a display power save request from an operating system, an application program, or a power management program which are executed in the computer system, for determining, with reference to the selected enable or disable data in the memory unit, whether or not the DPMS function is enabled, and means for interrupting the supply of at least one of the horizontal and vertical synchronization signals from the display controller to the CRT display in accordance with the display power save request.

2. The computer system according to claim 1, wherein the DPMS function includes a display stand-by mode for interrupting the supply of the horizontal synchronization signal, a display suspend mode for interrupting the supply of the horizontal synchronization signal, and a display off mode for interrupting the supply of both the horizontal and vertical synchronization signals, and the power save control means controls the interruption of the supply of the horizontal and vertical synchronization signals in accordance with the power save mode designated in response to the display power save request.

3. The computer system according to claim 1, wherein the display controller controls the display of each of the flat panel display with a back light and the CRT display, and further comprising:

key-input waiting-period monitoring means for monitoring the key-input waiting period of each of the operating system and the application program executed in the computer system;

means for turning off the back light of the flat panel display to turn off the display of the same when the key-input waiting-period monitoring means has detected that a key-input waiting state has been kept for a predetermined period of time; and means for issuing the display power save request and activating the power save control means when the key-input waiting-period monitoring means has detected that the key-input waiting state has been kept for the predetermined period of time.

4. A consumption power control method for a CRT display connected to a computer system provided with the CRT display and a flat panel display as a display monitor, comprising the steps of:

selecting, by a user, enable or disable of each of an auto display off function and a DPMS (Digital Power Management Signaling) function, the auto display off function turning off the display of the flat panel display unit and the DPMS function saving power of the CRT display unit if no key input is present for a predetermined period of time;

determining, when a display power save request has been issued from an operating system, an application program, or a power management program which are executed in the computer system, whether or not the DPMS function is enabled, with reference to the selected enable of disable data controlling the supply of the horizontal and vertical synchronization signals to the CRT display on the basis of the determination result; and allowing or prohibiting the execution of the power control function in accordance with the selected enable or disable data.

5. A computer system provided with a CRT display and a flat panel display as a display monitor, comprising:

a display controller for controlling the display of each of the CRT display and a flat panel display;

means for causing a user to select enable or disable of each of an auto display off function and a DPMS (Digital Power Management Signaling) function, the auto display off function turning off the display of the flat panel display unit and the DPMS function saving power of the CRT display unit if no key input is present for a predetermined period of time;

a memory unit storing the selected enable or disable data of each of the auto display off function and the DPMS function; and power save control means including:

means responsive to a display power save request from an operating system, an application program, or a power management program which are executed in the computer system, for determining, with reference to the selected enable or disable data in the memory unit, whether or not the DPMS function is enabled;

means for interrupting the supply of at least one of the horizontal and vertical synchronization signals from the display controller to the CRT display if it is determined that the DPMS function is enabled; and means for turning off the flat panel display if the data in the memory unit indicates that the auto-display-off function is enabled.

6. A dissipating-power control method of a CRT display in a computer system that includes a Basic Input and Output (BIOS) ROM memory with a video system stored in the BIOS ROM memory and is provided with the CRT display as a display monitor, the method comprising the steps executed by the computer system of:

a) setting in response to an instruction from at least one of an operating system (OS) and an application program, a function code in a first register and a sub-function code in a second register for calling an information obtaining function of the video system, and for executing a BIOS instruction;

b) obtaining Display Power Management Signaling (DPMS) enable/disable information prestored in a memory in response to the execution of said BIOS instruction;

c) obtaining from the BIOS ROM memory, DPMS support information indicating a DPMS function supported by the video system when the DPMS enable/disable information indicates enable, the DPMS support information comprising data indicating a mode in which the DPMS function is not supported, data indicating a display stand-by mode in which a supplement of a horizontal synchronization signal ceases, a display suspend mode in which a supplement of a vertical synchronization signal ceases, and a display off mode in which a supplement of both the horizontal synchronization signal and the vertical synchronization signal ceases;

d) setting a function completion code and the obtained DPMS support information in said first register and a third register respectively, and returning control to the OS or the application program; and e) supplying the value from said second register to the OS or the application program to check the DPMS function supported by the computer system.

7. A dissipating-power control method of a CRT display in a computer system having a memory, wherein the computer system is provided with the CRT display as a display monitor, the dissipating-power control method comprising the steps executed by the computer system of:

a) setting in response to an instruction from at least one of an operating system (OS) and an application program, a function code in a first register and a sub-function code in a second register for calling a display power status setting function, setting in a third register, display power status information designating a CRT operation mode, and for executing a Basic Input and Output System (BIOS) instruction, obtaining the display power status information comprising data indicating a display on mode in which both a horizontal synchronization signal and a vertical synchronization signal are supplied, data indicating a display stand-by mode in which a supplement of the horizontal synchronization signal ceases, data indicating a display suspend mode in which a supplement of the vertical synchronization signal ceases, and a display off mode in which a supplement of both the horizontal synchronization signal and the vertical synchronization signal ceases;

b) obtaining a Display Power Management Signaling (DPMS) enable/disable information prestored in the memory in response to the execution of said BIOS instruction;

c) setting a designated display power status information in a DPMS control register when the DPMS enable/disable information designates enable, thereby switching an operation mode of the CRT display;

d) setting a function completion code in said first register and returning a control to the OS or the application program; and f) checking a function completion code by the OS or the application program.

8. A dissipating-power control method of a CRT display in a computer system having a memory and provided with the CRT display as a display monitor, comprising the steps executed by the computer system of:

a) setting in response to an instruction from at least one of an operating system (OS) and an application program a function code in a first register and a sub-function code in a second register, for calling a display power status obtaining function, and for executing a Basic Input and Output System (BIOS) instruction;

b) obtaining Display Power Management Signaling (DPMS) enable/disable information prestored in the memory in response to the execution of said BIOS instruction;

c) reading a current CRT operation mode from the DPMS control register when said DPMS enable/disable information indicates enable, the display power status information comprising data indicating a display on mode in which both a horizontal synchronization signal and a vertical synchronization signal are supplied, data indicating a display stand-by mode in which a supplement of the horizontal synchronization signal ceases, data indicating a display suspend mode in which a supplement of the vertical synchronization signal ceases, and a display off mode in which a supplement of both the horizontal synchronization signal and the vertical synchronization signal ceases;

d) setting a function completion code and power status information corresponding to the read-out CRT operation mode in said first register and a third register respectively, and setting the function completion code indicting an error in said first register, and returning control to the OS or the application program when said DPMS enable/disable information indicates disable; and e) supplying the value from said third register to the OS or the application program to check a current CRT operation mode.

9. A computer system, comprising:

a display unit including a CRT display unit and a flat panel display unit;

a display controller for supplying horizontal and vertical synchronization signals (HSYNC, VSYNC) to the CRT display unit;

means for causing a user to select enable or disable of each of an auto display off function and a DPMS (Digital Power Management Signaling) function, the auto display off function turning off the display of the flat panel display unit and the DPMS function saving power of the CRT display unit if no key input is present for a predetermined period of time;

a memory for storing the selected enable or disable data of each of the auto display off function and the DPMS function;

means for determining whether or not the DPMS function is enabled by referring to the data stored in the memory; and means for interrupting at least one of the HSYNC and VSYNC to be supplied to the CRT display unit at times when the DPMS function is determined to be enabled by the determining means.

10. A computer system, comprising:

a display unit including a CRT display unit and a flat panel display unit;

a display controller for supplying horizontal and vertical synchronization signals (HSYNC, VSYNC) including a supplement thereof to the CRT display unit;

means for causing a user to select enable or disable of each of an auto display off function and a DPMS (Digital Power Management Signaling) function, the auto display off function turning off the display of a flat panel display unit and the DPMS function saving power of the CRT display unit if no key input is present for a predetermined period of time;

a memory for storing the selected enable or disable data of each of the auto display off function and the DPMS function;

means for discriminating between the CRT display and the flat panel type of the display unit;

means for determining whether or not the auto display off function is enabled by referring to the selected enable or disable data stored in the memory at times when the discriminating means discriminates the flat panel display unit and for determining whether or not the DPMS function is enabled at times when the discriminating means discriminates the CRT display unit, means for turning off a display of the flat panel display unit when the determining means determines that the display auto off function is enabled; and means for interrupting the supplement of at least one of the HSYNC and VSYNC to the CRT display unit when the determining means determines that the DPMS function is enabled.

11. A computer system, comprising:

a display unit including a CRT display unit and a flat panel display unit;

a display controller including:
 a CRT controller for generating horizontal and vertical synchronization signals (HSYNC, VSYNC) to be supplied to the CRT display unit, and
 a gate circuit for gating the supplement of the HSYNC and VSYNC to be supplied to the CRT display unit;

means for causing a user to select enable or disable of each of an auto display off function and a DPMS (Digital Power Management Signaling) function, the auto display off function turning off the display of the flat panel display unit and the DPMS function saving power of the CRT display unit if no key input is present for a predetermined period of time;

a memory for storing the selected enable or disable data of each of the auto display off function and the DPMS function;

means for determining whether or not the DPMS function is enabled by referring to the data stored in the memory; and means for causing the gate circuit to interrupt at least one of the HSYNC and VSYNC to be supplied to the CRT display unit at times when the determining means determines the enable of the DPMS function.

12. A computer system, comprising:

a display unit including a CRT display unit and a flat panel display unit;

a display controller, including:
 a CRT controller for generating horizontal and vertical synchronization signals (HSYNC, VSYNC) including a supplement thereof to be supplied to the CRT display unit, and
 a gate circuit for gating the supplement of the HSYNC and VSYNC to the CRT display unit;

means for causing a user to select enable or disable of each of an auto display off function and a DPMS (Digital Power Management Signaling) function, the auto display off function turning off the display of a flat panel display unit and the DPMS function saving power of the CRT display unit if no key input is present for a predetermined period of time;

a memory for storing the selected enable or disable data of each of the auto display off function and the DPMS function;

means for discriminating between the CRT display and the flat panel type of the display unit;

means for determining whether or not the auto display off function is enabled by referring to the selected enable or disable data stored in the memory at times when the discriminating means discriminates the flat panel display unit, and for determining whether or not the DPMS function is enabled the discriminating means discriminates the CRT display unit;

means for turning off a display of the flat panel display unit when the determining means determines that the display auto off function is enabled; and means for causing the gate circuit to interrupt the supplement of at least one of the HSYNC and VSYNC to the CRT display unit when the determining means determines that the DPMS function is enabled.

13. A computer system, comprising:

a display unit including a CRT display unit and a flat panel display unit;

a display controller for generating horizontal and vertical synchronization signals (HSYNC, VSYNC) to be supplied to the CRT display unit;

a gate circuit for gating the supplement of the HSYNC and VSYNC to be supplied to the CRT display unit;

a register for storing control data for causing the gate circuit to pass or gate the HSYNC and VSYNC including a supplement thereof to be supplied to the CRT display unit;

means for causing a user to select enable or disable of each of an auto display off function and a DPMS (Digital Power Management Signaling) function, the auto display off function turning off the display of the flat panel display unit and the DPMS function saving power of the CRT display unit if no key input if present for a predetermined period of time;

a memory for storing the selected enable or disable data of each of the auto display off function and the DPMS function;

means for determining whether or not the DPMS function is enabled by referring to the selected enable or disable data stored in the memory; and means for setting the control data in the register to cause the gate circuit to interrupt at least one of the HSYNC and VSYNC to be supplied to the CRT display unit at times when the determining means determines the enable of the DPMS function.

14. A computer system, comprising:

a display unit including a CRT display unit and a flat panel display unit;

a display controller for generating horizontal and vertical synchronization signals (HSYNC, VSYNC) including a supplement thereof to be supplied to the CRT display unit;

a gate circuit for gating the supplement of the HSYNC and VSYNC to the CRT display unit;

a register for storing control data for causing the gate circuit to pass or gate the HSYNC and VSYNC;

means for causing a user to select enable or disable of each of an auto display off function and a DPMS (Digital Power Management Signaling) function, the auto display off function turning off the display of a flat panel display unit and the DPMS function saving power of the CRT display unit if no key input is present for a predetermined period of time;

a memory for storing the selected enable or disable data of each of the auto display off function and the DPMS function;

means for discriminating between the CRT display and the flat panel type of the display unit;

means for determining whether or not the auto display off is enabled by referring to the selected enable or disable data stored in the memory at times when the discriminating means discriminates that the display unit is the flat panel display unit, and for determining whether or not the DPMS function is enabled at times when the discriminating means discriminates that the display unit is the CRT display unit;

means for turning off a display of the flat panel display unit when the determining means determines that the display auto off function is enabled; and means for setting the control data in the register to cause the gate circuit to interrupt the supplement of at least one of the HSYNC and VSYNC to the CRT display unit when the determining mean determines that the DPMS function is enabled.

15. A computer system, comprising:

a display unit including a CRT display unit and a flat panel display unit;

a display controller including:
  a CRT controller for generating horizontal and vertical synchronization signals (HSYNC, VSYNC) including a supplement thereof to be supplied to the CRT display unit,
  a gate circuit for gating the supplement of the HSYNC and VSYNC to be supplied to the CRT display unit, and
  a register for storing control data for causing the gate circuit to pass or gate the HSYNC and VSYNC to be supplied to the CRT display unit;

means for causing a user to select enable or disable of each of an auto display off function and a DPMS (Digital Power Management Signaling) function, the auto display off function turning off the display of the flat panel display unit and the DPMS function saving power of the CRT display unit if no key input is present for a predetermined period of time;

a memory for storing the selected enable or disable data of each of the auto display off function and the DPMS function;

means for determining whether or not the DPMS function is enabled by referring to the selected enable or disable data stored in the memory; and means for setting the control data in the register to cause the gate circuit to interrupt at least one of the HSYNC and VSYNC to be supplied to the CRT display unit at times when the determining means determines the enable of the DPMS function.

16. A computer system, comprising:

a display unit including a CRT display unit and a flat panel display unit;

a display controller including:
  a CRT controller for generating horizontal and vertical synchronization signals (HSYNC, VSYNC) including a supplement thereof to be supplied to the CRT display unit, a gate circuit for gating the supplement of the HSYNC and VSYNC to the CRT display unit, and a register for storing control data for causing the gate circuit to pass or gate the HSYNC and VSYNC;

means for causing a user to select enable or disable of each of an auto display off function and a DPMS (Digital Power Management Signaling) function, the auto display off function turning off the display of a flat panel display unit and the DPMS function saving power of the CRT display unit if no key input is present for a predetermined period of time;

a memory for storing the selected enable or disable data of each of the auto display off function and the DPMS function;

means for discriminating between the CRT display and the flat panel type of the display unit;

means for determining whether or not the auto display off is enabled by referring to the selected enable or disable data stored in the memory when the discriminating means discriminates that the display unit is the flat panel display unit and for determining whether or not the DPMS function is enabled at times when the discriminating means discriminates that the display unit is the CRT display unit;

means for turning off a display of the flat panel display unit when the determining means determines that the display auto off function is enabled; and means for setting the control data in the register to cause the gate circuit to interrupt the supplement of at least one of the HSYNC and VSYNC to the CRT display unit when the determining means determines that the DPMS function is enabled.

17. A computer system, comprising:

a CRT display unit including a first memory storing data representing VESA (Video Electronics Standards Association) DPMS (Display Power Management Signaling) compliant CRT display unit;

a display controller for supplying horizontal and vertical synchronization signals (HSYNC, VSYNC) including a supplement thereof to the CRT display unit;

means for reading the data stored in the first memory to recognize that the CRT display unit is the VESA-DPMS compliant CRT display unit;

means for causing a user to select enable or disable of each of an auto display off function and a DPMS (Digital Power Management Signaling) function, the auto display off function turning off the display of a flat panel display unit and the DPMS function saving power of the CRT display unit if no key input is present for a predetermined period of time;

a second memory for storing the selected enable or disable data of each of the auto display off function and the DPMS function;

means for determining whether or not the DPMS function is enabled or not by referring to the selected enable or disable data stored in the second memory; and means for interrupting at least one of the HSYNC and VSYNC to be supplied to the CRT display unit when the determining means determines that the DPMS function is enabled and for supplying at least one of the HSYNC and VSYNC to the CRT display unit when the determining means determines that the DPMS function is disabled at times when the recognizing means recognizes the VESA-DPMS compliant CRT display unit.

18. A computer system, comprising:

a display unit including a CRT display unit and a flat panel display unit, the CRT display unit including a first memory storing data representing VESA (Video Electronics Standards Association)-DPMS (Display Power Management Signaling) compliant CRT display unit;

a display controller for supplying horizontal and vertical synchronization including a supplement thereof to the CRT display unit;

means for reading the control data stored in the first memory to recognize that the CRT display unit is a VESA-DPMS compliant CRT display unit;

means for causing a user to select enable or disable of each of an auto display off function and a DPMS (Digital Power Management Signaling) function, the auto display off function turning off the display of a flat panel display unit and the DPMS function saving power of the CRT display unit if no key input is present for a predetermined period of time;

a second memory for storing the selected enable or disable data of each of the auto display off function and the DPMS function;

means for discriminating between the CRT display and the flat panel type of the display unit;

means for determining whether or not the auto display off is enabled by referring to the selected enabler or disable data stored in the second memory at times when the discriminating means discriminates that the display unit is the flat panel display unit, and for determining whether or not the DPMS function is enabled at times when the discriminating means discriminates that the display unit is the CRT display unit;

means for turning off a display of the flat panel display unit when the determining means determines that the display auto off function is enabled; and means for interrupting the supplement of at least one of the HSYNC and VSYNC to the CRT display unit when the determining means determines that the DPMS function is enabled at times when the recognizing means recognizes the VESA-DPMS complaint CRT display unit.

19. A computer system, comprising:

a CRT display unit including a first memory storing data representing VESA (Video Electronics Standards Association)-DPMS (Display Power Management Signaling) compliant CRT display unit;

a display controller including:

a CRT controller for generating horizontal and vertical synchronization signals (HSYNC, VSYNC) including a supplement thereof to be supplied to the CRT display unit, a gate circuit for gating the HSYNC and VSYNC to be supplied to the CRT display unit, and a register for storing control data for causing the gate circuit to pass or gate the HSYNC and VSYNC;

means for reading the data stored in the first memory to recognize that the CRT display unit is the VESA-DPMS compliant CRT display unit;

means for causing a user to select enable or disable of each of an auto display off function and a DPMS (Digital Power Management Signaling) function, the auto display off function turning off the display of a flat panel display unit and the DPMS function saving power of the CRT display unit if no key input is present for a predetermined period of time;

a second memory for storing the selected enable or disable data of each of the auto display off function and the DPMS function;

means for determining whether or not the DPMS function is enabled or not by referring to the selected enable or disable data stored in the second memory; and means for interrupting at least one of the HSYNC and VSYNC to be supplied to the CRT display unit when the determining means determines that the DPMS function is enabled and for supplying at least one of the HSYNC and VSYNC to the CRT display unit when the determining means determines that the DPMS function is disabled when the recognizing means recognizes the VESA-DPMS compliant CRT display unit.

20. A computer system, comprising:

a display unit including a CRT display unit and a flat panel display unit, the CRT display unit including a first memory storing data representing VESA (Video Electronics Standards Association)-DPMS (Display Power Management Signaling) compliant CRT display unit;

a display controller including:

a CRT controller for generating horizontal and vertical synchronization signals (HSYNC, VSYNC) including a supplement thereof to be supplied to the CRT display unit, a gate circuit for gating the HSYNC and VSYNC to be supplied to the CRT display unit, and a register for storing control data for causing the gate circuit to pass or gate the HSYNC and VSYNC;

means for reading the data stored in the first memory to recognize that the CRT display unit is the VESA-DPMS compliant CRT display unit;

means for reading the control data stored in the first memory to recognize that the CRT display unit is a VESA-DPMS compliant CRT display unit;

means for causing a user to select enable or disable of each of an auto display off function and a DPMS (Digital Power Management Signaling) function, the auto display off function turning off the display of a flat panel display unit and the DPMS function saving power of the CRT display unit if no key input is present for a predetermined period of time;

a second memory for storing the selected enable or disable data of each of the auto display off function and the DPMS function;

means for discriminating between the CRT display and the flat panel type of the display unit;

means for determining whether or not the auto display off is enabled by referring to the selected enable or disable data stored in the second memory at times when the discriminating means discriminates that the display unit is the flat panel display unit, and for determining whether or not the DPMS function is enabled at times when the discriminating means discriminates that the display unit is the CRT display unit;

means for turning off a display of the flat panel display unit when the determining means determines that the display auto off function is enabled;

means for interrupting the supplement of at least one of the HSYNC and VSYNC to the CRT display unit when the determining means determines that the DPMS function is enabled at times when the recognizing means recognizes the VESA-DPMS compliant CRT display unit.

* * * * *

UNITED STATES PATENT AND TRADEMARK OFFICE
CERTIFICATE OF CORRECTION

PATENT NO. : 5,696,978
DATED : December 09, 1997
INVENTOR(S) : Hirofumi NISHIKAWA It is certified that error appears in the above-indentified patent and that said Letters Patent is hereby corrected as shown below:

Claim 1, column 10 line 32, after "storing", delete "a".

Claim 4, column 11, line 24, after "data" insert --;--.

Claim 6, column 11, line 67, "(OS)" should read --(OS)--.

Claim 6, column 12, line 26," OS " should read --(OS)--.

Claim 8, column 13, line 35," OS " should read --(OS)--.

Claim 14, column 16, line 26, "mean" should read --means--.

Claim 18, column 18, line 8, after "synchronization", insert --signals (HSYNC, VSYNC)--.

UNITED STATES PATENT AND TRADEMARK OFFICE
CERTIFICATE OF CORRECTION

PATENT NO. : 5,696,978
DATED : December 09, 1997
INVENTOR(S) : Hirofumi NISHIKAWA It is certified that error appears in the above-indentified patent and that said Letters Patent is hereby corrected as shown below:

Claim 18, column 18, line 41, "complaint" should read --compliant--.

Claim 20, column 20, line 25, after "enabled;", insert --and--.

Signed and Sealed this

Second Day of June, 1998

Attest:

BRUCE LEHMAN

Attesting Officer

Commissioner of Patents and Trademarks